(12) United States Patent
Maggiolino

(10) Patent No.: US 7,855,474 B2
(45) Date of Patent: Dec. 21, 2010

(54) SYSTEM AND METHOD FOR PRE-DETECTION IN A POWER OVER ETHERNET SYSTEM

(75) Inventor: Louis Joseph Maggiolino, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 173 days.

(21) Appl. No.: 12/131,183

(22) Filed: Jun. 2, 2008

(65) Prior Publication Data

US 2009/0063066 A1 Mar. 5, 2009

Related U.S. Application Data

(60) Provisional application No. 60/968,412, filed on Aug. 28, 2007.

(51) Int. Cl.
*H02J 1/00* (2006.01)

(52) U.S. Cl. .......................... 307/85; 709/220
(58) Field of Classification Search .................. 307/85
See application file for complete search history.

(56) References Cited

U.S. PATENT DOCUMENTS

| | | | |
|---|---|---|---|
| 2004/0260794 A1* | 12/2004 | Ferentz et al. | 709/220 |
| 2006/0077888 A1* | 4/2006 | Karam et al. | 370/216 |
| 2007/0165548 A1 | 7/2007 | Woo et al. | |
| 2008/0040625 A1* | 2/2008 | Vorenkamp et al. | 713/340 |
| 2009/0033345 A1* | 2/2009 | Picard et al. | 324/705 |

* cited by examiner

*Primary Examiner*—Robert L. Deberadinis
(74) *Attorney, Agent, or Firm*—Duane S. Kobayashi (57) ABSTRACT

A system and method for pre-detection in a power over Ethernet (PoE) system. A power sourcing equipment (PSE) is designed to measure a port voltage upon application of a small current source. A microcontroller controls the current source based on a comparison of the measured port voltage to a threshold voltage.

16 Claims, 7 Drawing Sheets

SYSTEM AND METHOD FOR PRE-DETECTION IN A POWER OVER ETHERNET SYSTEM

This application claims priority to provisional application No. 60/968,412, filed Aug. 28, 2007, which is incorporated by reference herein, in its entirety, for all purposes.

BACKGROUND

1. Field of the Invention

The present invention relates generally to Power over Ethernet (PoE) and, more particularly, to a system and method for pre-detection in a PoE system.

2. Introduction

The IEEE 802.3af and 802.3at PoE specifications provide a framework for delivery of power from power sourcing equipment (PSE) to a powered device (PD) over Ethernet cabling. In this framework, various PDs can be deployed such as voice over IP (VoIP) phones, wireless LAN access points, network cameras, computing devices, etc.

In a conventional PoE process, a valid device detection is first performed. This detection process identifies whether or not it is connected to a valid PoE device. As part of this process, the typical detection process can present voltages of up to 30V for up to 200 ms if no valid PD is connected to the RJ45 connector. This voltage can be potentially damaging to equipment connected to the port. What is needed therefore is a protection mechanism for the PD detection process.

SUMMARY

A system and/or method for pre-detection in a PoE system, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
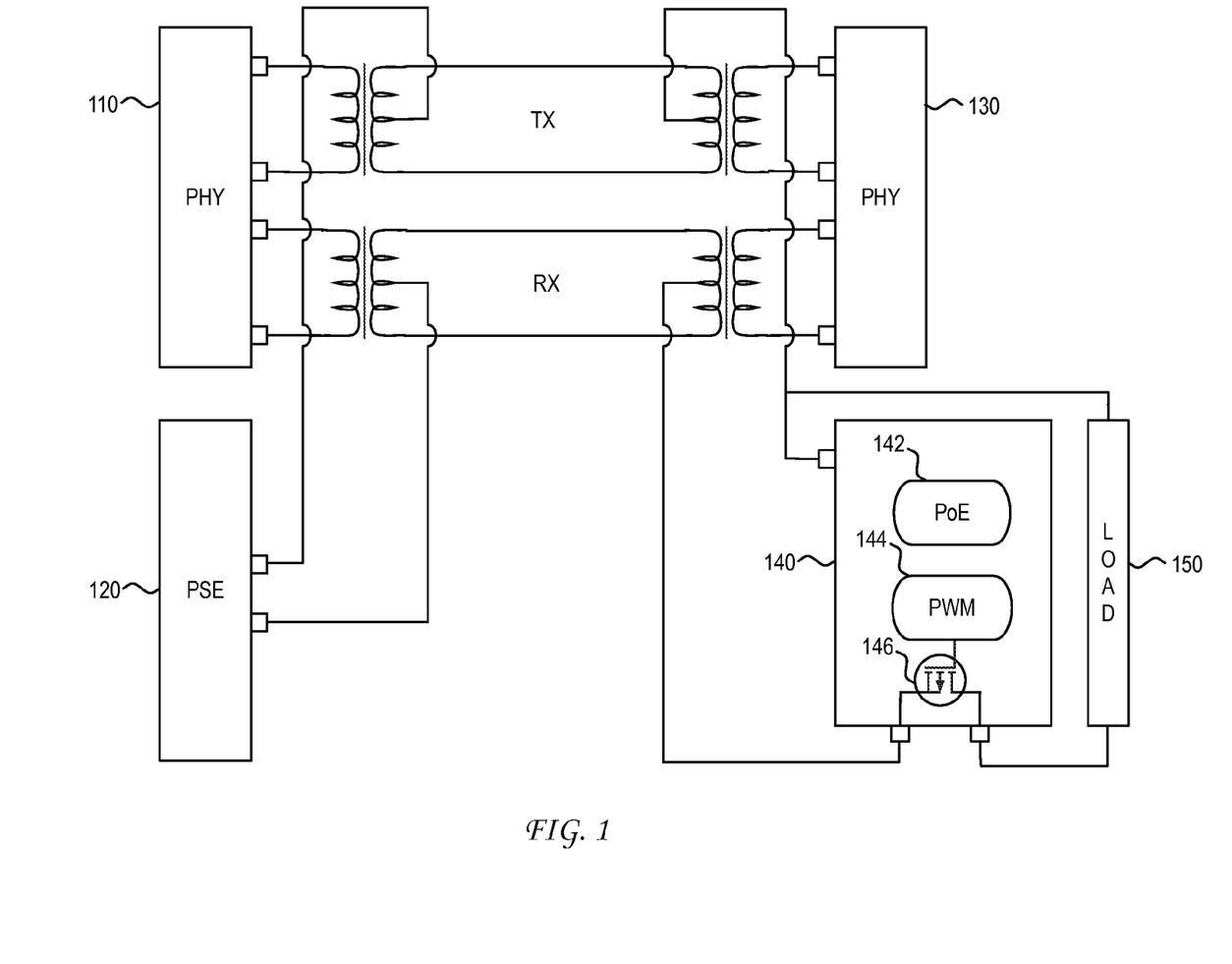
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W. Other proprietary solutions can potentially deliver even higher levels of power to a PD (e.g., 60 W of power to a PD over four pairs). In general, high power solutions are often limited by the limitations of the cabling.

As noted, a conventional PoE process begins with a device detection process. In the IEEE 802.3af standard, a voltage (or current) is applied between the transmit and receive wire pairs. The PSE then measures the current (or voltage) to determine whether a signature 25 kΩ resistance detected. If the PSE does not detect a valid 25 kΩ resistance, then the PSE does not apply power to the port.

In various detection processes, voltages ranging from 10V-30V can appear on a port. Such voltage conditions can be potentially damaging to equipment connected to the port. In accordance with the present invention, such potentially damaging situations are limited through the inclusion of a pre-detection process. This pre-detection process is designed to occur prior to the activation of a detection process. As such, the activation of the detection process is contingent on the proper satisfaction of the conditions of the pre-detection process. If the conditions of the pre-detection process are not satisfied, then the detection process will not commence. This limits the potential of damaging non-PD equipment that is connected to a PSE port.

In the present invention, a small current source (e.g., 50μA) is used to facilitate the pre-detection process. This small current source, in combination with voltage measurements, is used to determine whether a device coupled to the port is potentially vulnerable to the PSE's detection process.

Figure 2:
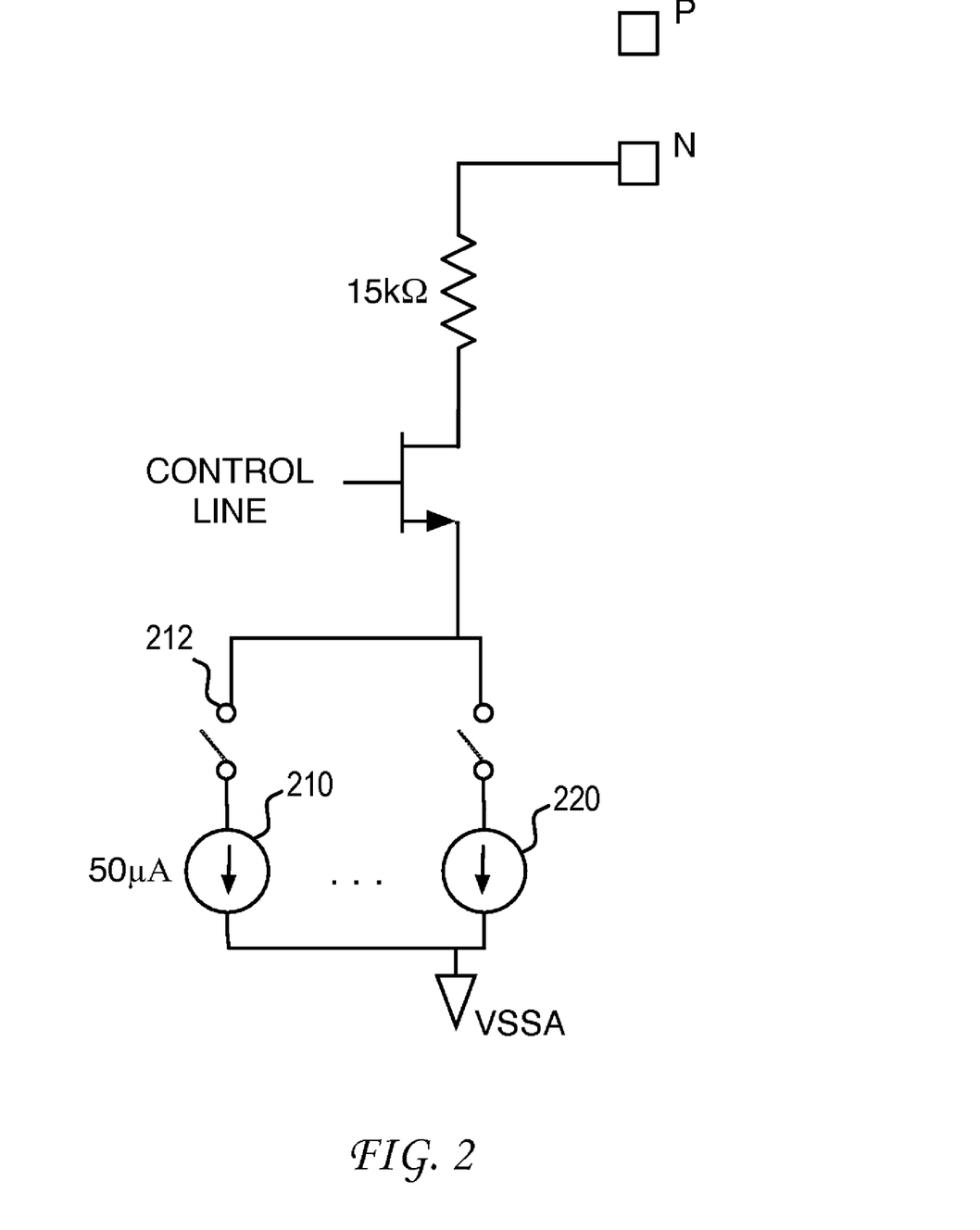
FIG. 2 illustrates an embodiment of a current source used during pre-detection.

FIG. 2 illustrates an embodiment of a PSE that incorporates a current source module for use in a pre-detection process. As illustrated, the current source module includes multiple current sources 210, 220. Here, current source 210 is a 50μA current source. Current source 220, on the other hand, can be a larger current source (e.g., 850μA) that is to be used during the detection process. As would be appreciated, other current sources could also be included in the current source module to facilitate detection of other devices such as legacy PDs that do not confirm with IEEE 802.3af. Each of the current sources can be selectively activated/deactivated using their respective switches.

In the pre-detection process, switch 212 is closed, thereby enabling the sourcing of a small fixed current from current source 210 through the VPORTN pin. As will be described in greater detail below, measurement of the slew-rate of the Vport voltage can be used to extract the impedance at the RJ45 ports. In accordance with the present invention, the pre-detection process enables a determination of the amount of impedance seen on the RJ45 port to avoid too high of a voltage over the port. A high voltage can occur, for example, due to the impedance of the resistance/capacitance combination on the port.

Figure 3:
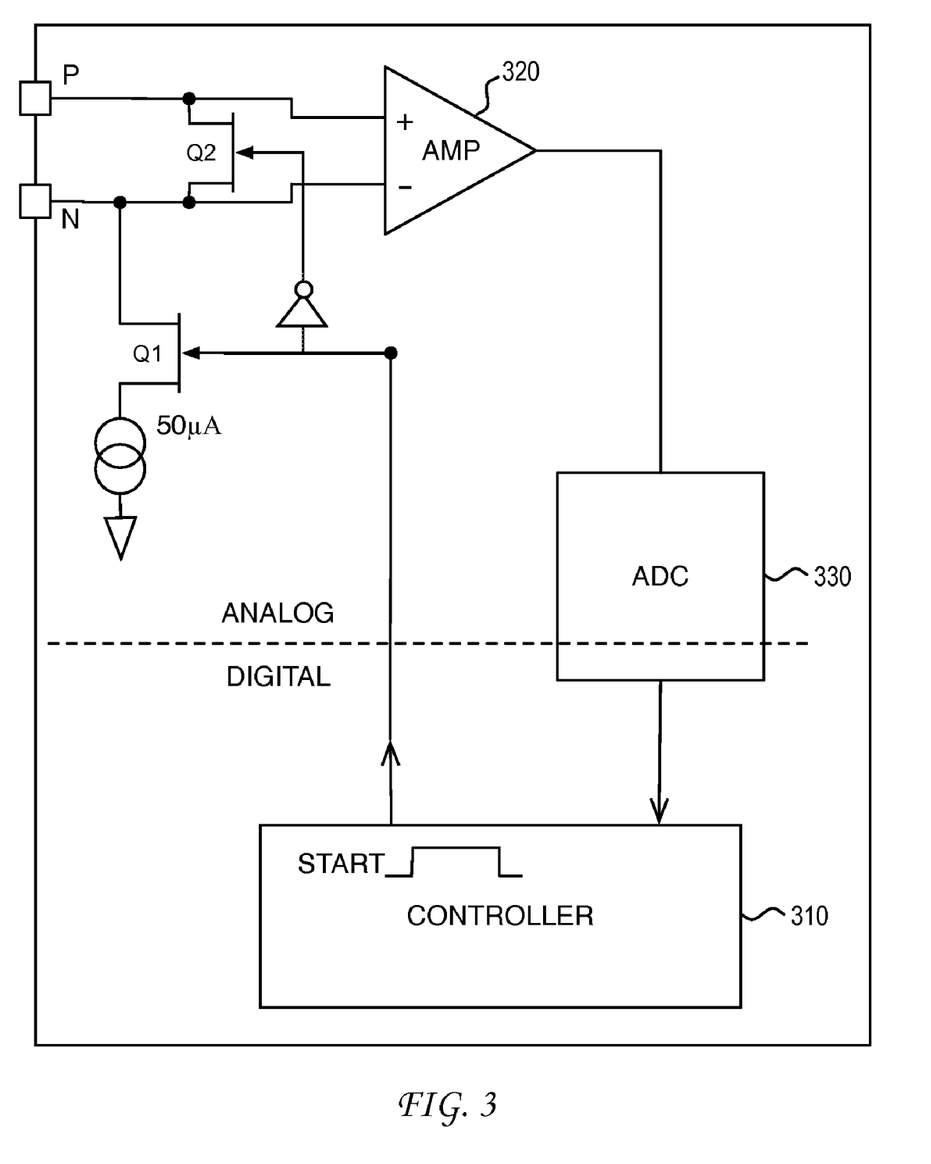
FIG. 3 illustrates an embodiment of a pre-detection mechanism.

FIG. 3 illustrates an embodiment of a pre-detection mechanism that enables a measurement of the port voltage upon application of current from a small current source. As illustrated, the pre-detection mechanism uses controller 310 to activate transistor Q1, which in turn activates the small 50µA current source. In one embodiment, transistor Q1 is activated for a pre-detection time period (e.g., 55 ms). During this pre-detection time period, amplifier (AMP) 320 monitors the port voltage and delivers a measured output that is converted by analog-to-digital converter (ADC) 320. ADC 320 then provides the resulting digital output to controller 310.

In one embodiment, controller 310 is designed to analyze the port voltage relative to a threshold voltage. This analysis enables controller 310 to monitor the port impedance. If the port impedance indicates that the device is potentially a valid PD, then the PSE would continue with a normal detection process (e.g., two point or four point detection).

Figure 4:
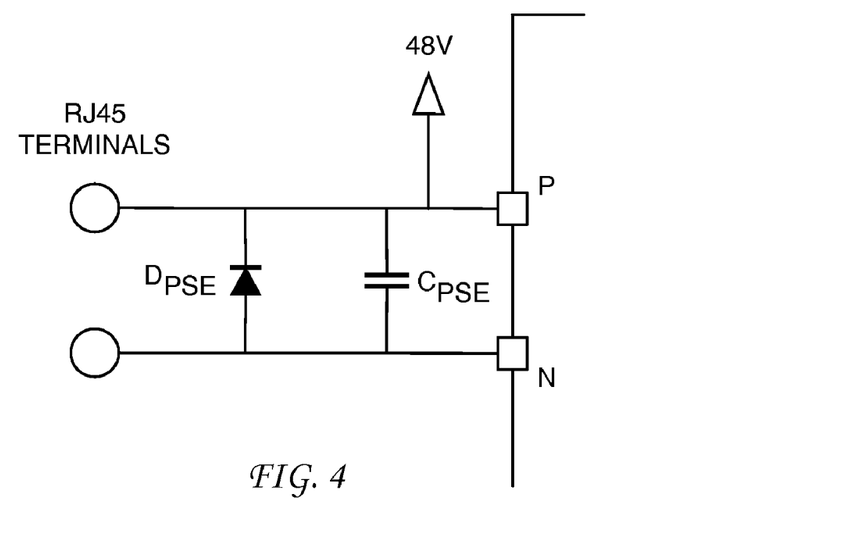
FIG. 4 illustrates a circuit model of a PoE system.
Figure 5:
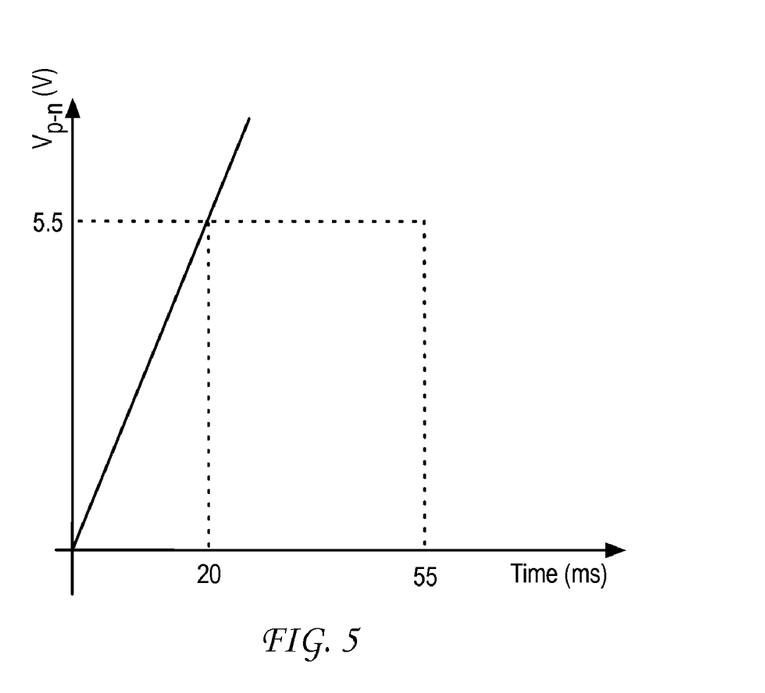
FIG. 5 illustrates an open circuit response during pre-detection.

As illustrated in FIG. 4, if no device is connected to the RJ45 port, the only impedance seen by the small current source is the $C_{pse}$ capacitance and possibly a few µA leakage on the high voltage components (inside or outside the PSE controller chip). FIG. 5 illustrates an example port voltage response when no device is connected to the RJ45 port. In this illustration, a threshold voltage of 5.5V is used in a pre-detection time period of 55 ms. For a typical $C_{pse}$=200 nF, a simple calculation shows that the 5.5V threshold would be obtained within t=$C_{pse}$*5.5V/50µA~22 ms.

In receiving the port voltage from ADC 330 during the pre-detection period, the PSE can determine when the port voltage crosses the voltage threshold of 5.5V. A crossing of this voltage threshold would lead controller 310 to cut off the small 50µA current source and preclude the start of a normal detection process.

As would be appreciated, the selection of a threshold voltage of 5.5V and pre-detection time period of 55 ms is based on various assumptions and design goals. In the present example, the selection of these parameters is designed to provide a relative margin of tolerance in the pre-detection of actual devices.

Figure 6:
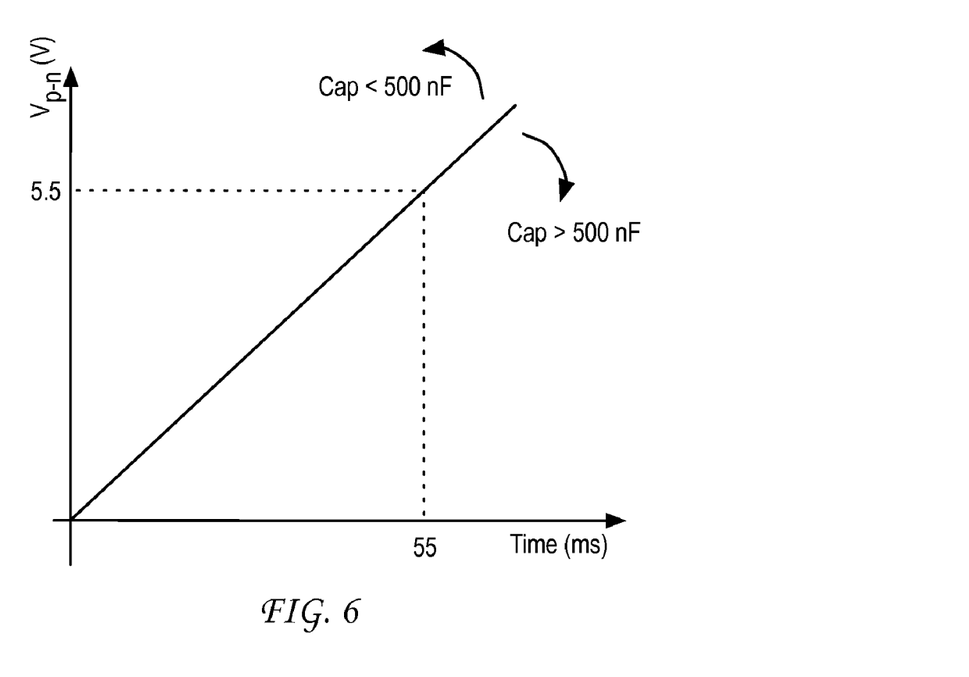
FIG. 6 illustrates a capacitive load response during pre-detection.

Consider for example, devices with a purely capacitive load. Here, a capacitive load of 500 nF would cause the 5.5V threshold to be reached in t=500 nF*5.5V/50µA=55 ms. FIG. 6 illustrates such a port voltage response. As illustrated, a capacitive load of less than 500 nF would cause the 5.5V threshold to be reached in less than 55 ms, while a capacitive load of greater than 500 nF would cause the 5.5V threshold to be reached in more than 55 ms. As a consequence, a minimum of 500 nF would need to be present between the RJ45 ports for the device to be identified as a potentially valid PD device. If the capacitive load is greater than 500 nF, then the 5.5V threshold would be violated prior to the expiration of the 55 ms pre-detection time period. As most real devices would exhibit a capacitive load of at least 1 µF, the 5.5V threshold and the 55 ms pre-detection time period provides a 1:2 margin of capacitive tolerance.

Figure 7:
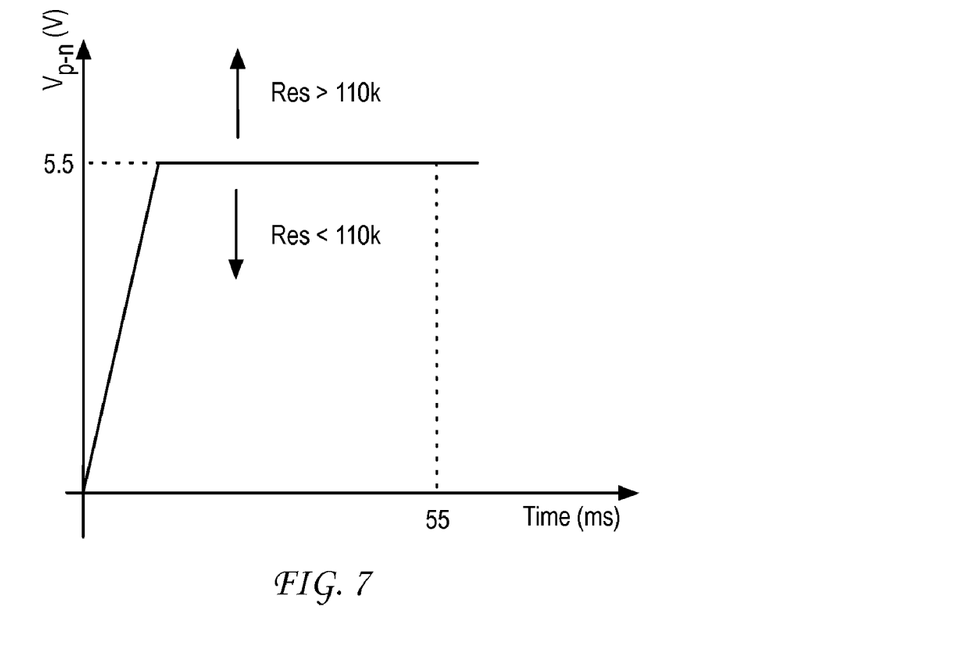
FIG. 7 illustrates a resistive load response during pre-detection.

FIG. 7 illustrates a voltage response of a 110 kΩ resistive load. As illustrated, the application of a small 50µA current source will produce a steady state voltage of V=50µA*110 kΩ=5.5V. If the resistive load is greater than 110 kΩ, then the steady state voltage would exceed the 5.5V threshold. Alternatively, if the resistive load is less than 110 kΩ, then the steady state voltage would not exceed the 5.5V threshold. As a consequence, a maximum of 110 kΩ can be present between the RJ45 ports for the device to be identified as a potentially valid PD device. If the resistive load is greater than 110 kΩ, then the 5.5V threshold would be violated prior to the expiration of the 55 ms pre-detection time period. As a valid PD device would have a pure resistance signature of ~30 kΩ maximum, the 5.5V threshold provides a 1:3.5 margin of resistive tolerance.

As has been described, the port voltage during a pre-detection time period can be analyzed relative to a threshold voltage, which thereby enables the PSE to monitor the port impedance. If the impedance indicates that the device is potentially a valid PD, then the PSE can continue with a normal detection process. In one embodiment, the comparison of the port voltage to a threshold voltage during a pre-detection time period can provide the PSE with valuable pre-detection information that enables the PSE to determine whether a detection process is warranted. As illustrated in FIGS. 6 and 7, if the threshold voltage is violated during the pre-detection time period, then the device is known to be an invalid PD device.

Figure 8:
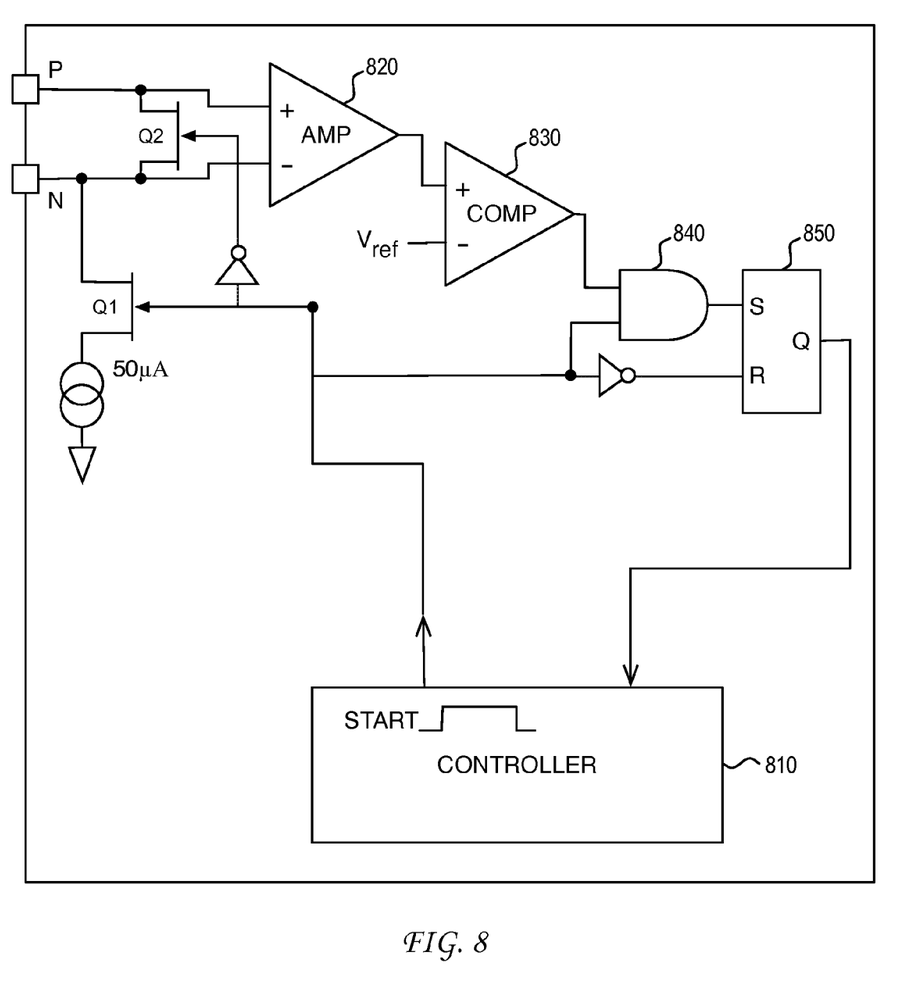
FIG. 8 illustrates another embodiment of a pre-detection mechanism.

In one embodiment, the pre-detection mechanism can be provided by a simple set of logic elements such as that illustrated in FIG. 8. In this embodiment, comparator 830 is designed to compare a port voltage output by AMP 820 to a voltage threshold ($V_{ref}$). When the port voltage exceeds $V_{ref}$, the logic high signal is passed on to SR latch 850 via AND gate 840. In this configuration, SR latch 850 would produce a logic high signal at the Q output when the port voltage exceeds $V_{ref}$. This output is then provided to controller 810 as an indication of whether the PD is invalid or potentially valid.

Figure 9:
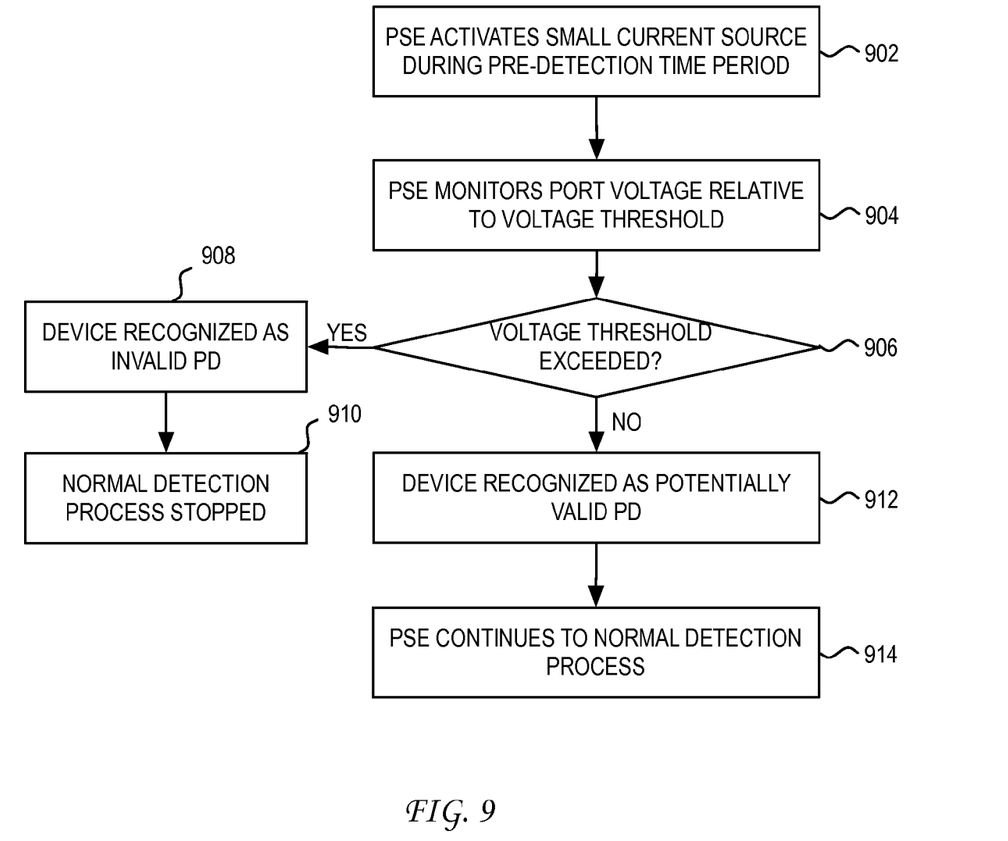
FIG. 9 illustrates a flowchart of a pre-detection process.

To further illustrate the principles of the present invention, reference is now made to the flowchart of FIG. 9. As illustrated, the process begins at step 902 where a PSE activates a small current source during a pre-detection time period. This pre-detection time period is prior to a conventional detection time period. In contrast to a conventional detection time period that is designed to identify a valid PD device through the detection of a signature resistance, the pre-detection time period is designed to identify an invalid PD device through the violation of a voltage threshold.

At step 904, the PSE monitors the port voltage upon activation of the small current source. In this process, the PSE would compare the port voltage to a voltage threshold. At step 906, it is then determined whether the port voltage has exceeded the threshold voltage during the pre-detection time period. If it is determined that the port voltage has exceeded the threshold voltage, then the PSE would recognize the device as an invalid PD device at step 908. As an invalid PD device could potentially be at risk from further PoE processing, the conventional PD detection process would be stopped at step 910.

If, on the other hand, it is determined at step 906 that the voltage threshold has not been exceeded during the pre-detection time period, then the PSE would recognize the device as a potentially valid PD device at step 912. While the device may not ultimately be identified as a valid PD device, the PSE at this point would recognize that the device would not be at risk should a detection process be invoked by the PSE. As such, at step 914, the PSE would then continue to a normal detection process. The result of this normal detection process would determine whether further PoE processing (e.g., classification or activation) is warranted on that port.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a power sourcing equipment of detecting a powered device, comprising:
    measuring a voltage across a port of a power sourcing equipment upon application of a current source to said port during a predetection time period;
    determining whether said measured voltage exceeds a threshold voltage level within said predetection time period;
    if it is determined that said measured voltage exceeds said threshold voltage level within said predetection time period, then classifying a device coupled to said port as an invalid powered device;
    if it is determined that said measured voltage does not exceed said threshold voltage level within said predetection time period, then classifying said device coupled to said port as a potentially valid powered device; and
    after determining that said device coupled to said port is a potentially valid powered device, then detecting a presence of a signature resistance at said device, wherein said detection enables a determination of whether said device is a valid powered device.

2. The method of claim 1, wherein said current source is distinct from a second current source used in said detection.

3. The method of claim 1, wherein said signature resistance is approximately 25 kΩ.

4. The method of claim 1, wherein said detecting does not occur if it is determined that said measured voltage exceeds said threshold voltage level.

5. The method of claim 1, wherein said detecting occurs in a 500 ms detection time period.

6. A power sourcing equipment, comprising:
    a first current source for use in a detection of a signature resistance of a device coupled to a port of the power sourcing equipment;
    a second current source for use in a process prior to said detection; and
    a controller that measures a voltage across a port of the power sourcing equipment upon application of said second current source, said controller controlling said second current source upon a comparison of said measured voltage to a threshold voltage, wherein if it is determined that said measured voltage exceeds said threshold voltage level within a predetection time period, then classifying a device coupled to said port as an invalid powered device, and if it is determined that said measured voltage does not exceed said threshold voltage level within a predetection time period, then classifying said device coupled to said port as a potentially valid powered device.

7. The power sourcing equipment of claim 6, wherein said signature resistance is approximately 25 kΩ.

8. The power sourcing equipment of claim 6, wherein said controller activates said first current source only if it is determined that said measured voltage does not exceed said threshold voltage within said predetection time period.

9. The power sourcing equipment of claim 6, wherein said controller activates said first current source during a 500 ms detection time period.

10. A power sourcing equipment, comprising:
    a first current source for use prior to a detection by the power sourcing equipment of a signature resistance in a powered device;
    a second current source for use during a detection by the power sourcing equipment of said signature resistance in said powered device; and
    a microcontroller that measures a voltage across a port of the power sourcing equipment upon application of said first current source to said port, said microcontroller activating said second current source only if a comparison of said measured voltage to a threshold voltage indicates that said threshold voltage has not been exceeded.

11. The power sourcing equipment of claim 10, wherein said microcontroller limits said first current source if said measured voltage exceeds said threshold voltage during a predetection time period.

12. The power sourcing equipment of claim 10, wherein said second current source is used during a 500 ms detection time period.

13. The power sourcing equipment of claim 12, wherein said first current source is activated during a predetection time period, said predetection time period occurring prior to said 500 ms detection time period.

14. The power sourcing equipment of claim 10, wherein said signature resistance is approximately 25 kΩ.

15. The power sourcing equipment of claim 10, wherein said second current source is not activated if said comparison of said measured voltage to said threshold indicates that said threshold voltage has been exceeded.

16. The power sourcing equipment of claim 10, wherein said first current source is an order of magnitude smaller than said second current source.

* * * * *